United States Patent
Ueda

(10) Patent No.: US 10,385,749 B2
(45) Date of Patent: Aug. 20, 2019

(54) EXHAUST GAS CONTROL APPARATUS FOR INTERNAL COMBUSTION ENGINE

(71) Applicant: Toyota Jidosha Kabushiki Kaisha, Toyota-shi, Aichi-ken (JP)

(72) Inventor: Hiroyoshi Ueda, Chigasaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 121 days.

(21) Appl. No.: 15/609,179

(22) Filed: May 31, 2017

(65) Prior Publication Data
US 2017/0350295 A1    Dec. 7, 2017

(30) Foreign Application Priority Data
Jun. 2, 2016  (JP) .................................. 2016-110751

(51) Int. Cl.
*F01N 3/20* (2006.01)
*F01N 13/00* (2010.01)
(Continued)

(52) U.S. Cl.
CPC ......... *F01N 3/2066* (2013.01); *F01N 3/0814* (2013.01); *F01N 3/0842* (2013.01); *F01N 3/101* (2013.01); *F01N 3/2053* (2013.01); *F01N 3/2073* (2013.01); *F01N 9/00* (2013.01); *F01N 9/002* (2013.01); *F01N 13/009* (2014.06); *F01N 2410/12* (2013.01); *F01N 2430/06* (2013.01); *F01N 2610/02* (2013.01);
(Continued)

(58) Field of Classification Search
CPC .... F01N 13/009; F01N 3/0814; F01N 3/0842; F01N 3/101; F01N 3/2053; F01N 3/2066; F01N 3/2073; F01N 9/00; F01N 9/002; F01N 2410/12; F01N 2430/06; F01N 2610/02; F01N 2900/1602; Y02T 10/22; Y02T 10/24; Y02T 10/47
USPC .......... 60/274, 276, 277, 286, 295, 299–301
See application file for complete search history.

(56) References Cited

U.S. PATENT DOCUMENTS

| 5,331,809 | A | 7/1994 | Takeshima et al. |
| 2012/0017587 | A1* | 1/2012 | Yoshida ................ F01N 3/0835 60/602 |

(Continued)

FOREIGN PATENT DOCUMENTS

| JP | H04-175416 A | 6/1992 |
| JP | 2005-351108 A | 12/2005 |

(Continued)

*Primary Examiner* — Audrey K Bradley
*Assistant Examiner* — Dapinder Singh
(74) *Attorney, Agent, or Firm* — Dinsmore & Shohl LLP

(57) ABSTRACT

An exhaust gas control apparatus for an internal combustion engine that can be operated at a lean air-fuel ratio is provided. This exhaust gas control apparatus is equipped with a three-way catalyst, an occlusion reduction NOx catalyst (an NSR catalyst) that is provided upstream of the three-way catalyst, a bypass passage that bypasses the NSR catalyst, a changeover valve that causes exhaust gas to flow through one of the bypass passage and the NSR catalyst, and an electronic control unit. The electronic control unit carries out rich spike, causes exhaust gas to flow through the bypass passage in starting rich spike, and causes exhaust gas to flow through the NSR catalyst after having carried out rich spike for a predetermined period.

4 Claims, 4 Drawing Sheets

(51) Int. Cl.
*F01N 3/08* (2006.01)
*F01N 9/00* (2006.01)
*F01N 3/10* (2006.01)

(52) U.S. Cl.
CPC ............... *F01N 2900/1602* (2013.01); *F01N 2900/1624* (2013.01); *Y02T 10/22* (2013.01); *Y02T 10/24* (2013.01); *Y02T 10/47* (2013.01)

(56) References Cited

U.S. PATENT DOCUMENTS

| | | | |
|---|---|---|---|
| 2013/0011313 A1* | 1/2013 | Bandl-Konrad ... | B01D 53/9431 423/212 |
| 2015/0226100 A1* | 8/2015 | Bandl-Konrad ... | B01D 53/9431 423/213.7 |
| 2016/0115851 A1* | 4/2016 | Kogo ................... | F01N 3/2066 60/276 |

FOREIGN PATENT DOCUMENTS

| | | |
|---|---|---|
| JP | 2007-002785 A | 1/2007 |
| JP | 2008-025524 A | 2/2008 |

* cited by examiner

EXHAUST GAS CONTROL APPARATUS FOR INTERNAL COMBUSTION ENGINE

CROSS-REFERENCE TO RELATED APPLICATIONS

This application claims priority to Japanese Patent Application No. 2016-110751 filed on Jun. 2, 2016, which is incorporated herein by reference in its entirety.

BACKGROUND

1. Technical Field

The disclosure relates to an exhaust gas control apparatus for an internal combustion engine.

2. Description of Related Art

There is known an art of arranging an occlusion reduction NOx catalyst (hereinafter referred to also as "an NSR catalyst") in an exhaust passage of an internal combustion engine. This NSR catalyst occludes NOx in exhaust gas when the air-fuel ratio of exhaust gas flowing thereinto is a lean air-fuel ratio, and reduces the occluded NOx when the air-fuel ratio of exhaust gas flowing thereinto is a rich air-fuel ratio. In reducing the NOx occluded by the NSR catalyst, rich spike for temporarily setting the air-fuel ratio of exhaust gas flowing into the NSR catalyst to a rich air-fuel ratio is carried out.

Besides, there is known an art of arranging a three-way catalyst in an exhaust passage of an internal combustion engine. The three-way catalyst efficiently purifies NOx, HC and CO when the catalyst atmosphere is at or close to a theoretical air-fuel ratio. This three-way catalyst has an oxygen occlusion capacity. The three-way catalyst occludes an excessive amount of oxygen when the air-fuel ratio of exhaust gas flowing into the three-way catalyst is a lean air-fuel ratio, and discharges a deficient amount of oxygen when the air-fuel ratio of exhaust gas flowing into the three-way catalyst is a rich air-fuel ratio. Due to this oxygen occlusion capacity, the three-way catalyst can purify HC, CO and NOx even when the air-fuel ratio of exhaust gas flowing into the three-way catalyst slightly deviates from the theoretical air-fuel ratio.

It should be noted herein that there is known an art of providing a three-way catalyst and an NSR catalyst in an exhaust passage of an internal combustion engine in this order from an upstream side (e.g., see Japanese Patent Application Publication No. 2005-351108 (JP 2005-351108 A)).

SUMMARY

In the case where the internal combustion engine is equipped with both the NSR catalyst and the three-way catalyst, it is also possible to provide the three-way catalyst downstream of the NSR catalyst. It should be noted herein that when rich spike is carried out, ammonia may be produced in the NSR catalyst. Accordingly, in the case where the three-way catalyst is provided downstream of the NSR catalyst, the ammonia produced in the NSR catalyst may flow into the three-way catalyst. Then, when ammonia flows into the three-way catalyst with oxygen occluded by the three-way catalyst, NOx may be generated through the oxidation of ammonia by the oxygen occluded by the three-way catalyst. That is, NOx may flow out of the three-way catalyst, through the act of carrying out rich spike for the NSR catalyst.

The disclosure has been made in view of the problems as described above. The disclosure provides an exhaust gas control apparatus for an internal combustion engine that reduces the amount of NOx flowing out of a three-way catalyst when the air-fuel ratio is temporarily lowered from a lean air-fuel ratio to a rich air-fuel ratio in the case where the three-way catalyst is provided downstream of an NSR catalyst.

Thus, according to one aspect of the disclosure, there is provided an exhaust gas control apparatus for an internal combustion engine that is operable at a lean air-fuel ratio. This exhaust gas control apparatus is equipped with a three-way catalyst, an occlusion reduction NOx catalyst, a bypass passage, a changeover valve and an electronic control unit. The three-way catalyst is provided in an exhaust passage of the internal combustion engine, and the exhaust passage includes a first exhaust passage and a second exhaust passage. The three-way catalyst is configured to occlude oxygen. The occlusion reduction NOx catalyst is provided in the exhaust passage upstream of the three-way catalyst. The occlusion reduction NOx catalyst is configured to: (i) occlude NOx at the lean air-fuel ratio, and (ii) reduce the NOx and produce ammonia at the rich air-fuel ratio. The bypass passage is configured to connect a first exhaust passage upstream of the occlusion reduction NOx catalyst and a second exhaust passage downstream of the occlusion reduction NOx catalyst and upstream of the three-way catalyst to each other. The changeover valve is configured to select one of the bypass passage or the occlusion reduction NOx catalyst and to cause exhaust gas to flow through the selected one of the bypass passage or the occlusion reduction NOx catalyst. The electronic control unit is configured to: (i) carry out rich spike for temporarily changing an air-fuel ratio of the internal combustion engine from the lean air-fuel ratio to the rich air-fuel ratio, (ii) operate the changeover valve such that exhaust gas flows through the bypass passage, in starting the rich spike in air-fuel ratio control, and (iii) operate the changeover valve such that exhaust gas flows through the occlusion reduction NOx catalyst after having carried out the rich spike for a predetermined period in the air-fuel ratio control.

When the internal combustion engine is operated at a lean air-fuel ratio, the amount of oxygen is excessive in the three-way catalyst, which makes it difficult to reduce NOx. In this case, if exhaust gas is caused to flow through the occlusion reduction NOx catalyst (the NSR catalyst), NOx can be occluded by the NSR catalyst. The NOx occluded by the NSR catalyst are reduced by carrying out rich spike. When this rich spike is carried out, ammonia may be produced in the NSR catalyst. The ammonia produced in the NSR catalyst flows into the three-way catalyst, which is located downstream. Then, if oxygen is occluded by the three-way catalyst when ammonia flows into the three-way catalyst, the oxygen occluded by the three-way catalyst and the ammonia that has flowed into the three-way catalyst react with each other to generate NOx.

Accordingly, if ammonia can be restrained from flowing into the three-way catalyst when oxygen is occluded by the three-way catalyst, NOx can be restrained from being generated in the three-way catalyst. That is, NOx can be restrained from being generated in the three-way catalyst unless the occlusion of oxygen by the three-way catalyst and the flow of ammonia into the three-way catalyst occur simultaneously. It should be noted herein that when the internal combustion engine is operated at a lean air-fuel ratio, oxygen flows into the three-way catalyst and hence creates a state where oxygen is occluded by the three-way catalyst. Accordingly, oxygen is occluded by the three-way catalyst immediately after the start of rich spike. That is, if ammonia is kept from flowing into the three-way catalyst immediately after the start of rich spike, NOx can be restrained from being generated in the three-way catalyst. In contrast, exhaust gas at a rich air-fuel ratio is kept from flowing into the NSR catalyst, by causing exhaust gas to flow into the bypass passage in starting rich spike. Therefore, no ammonia is produced in the NSR catalyst. Accordingly, ammonia can be restrained from flowing into the three-way catalyst.

Besides, when exhaust gas at a rich air-fuel ratio flows into the three-way catalyst via the bypass passage, oxygen is discharged from the three-way catalyst. Then, after oxygen is sufficiently discharged from the three-way catalyst, hardly no oxygen is occluded by the three-way catalyst. In this state, even when ammonia flows into the three-way catalyst, NOx can be restrained from being generated by the three-way catalyst. Accordingly, after oxygen is sufficiently discharged from the three-way catalyst by carrying out rich spike for a predetermined period, NOx can be restrained from being generated through the oxidation of ammonia by the three-way catalyst, even when exhaust gas is caused to flow through the NSR catalyst, the occluded NOx are reduced, and ammonia is thereby generated. Incidentally, the predetermined period mentioned herein is a period in which the amount of NOx generated in the three-way catalyst through ammonia falls within a permissible range even when this ammonia is generated due to the flow of exhaust gas through the NSR catalyst while rich spike is carried out. For example, this predetermined period may be a period to a timing when the amount of oxygen occluded by the three-way catalyst becomes equal to or smaller than a predetermined amount. This predetermined amount is an upper limit of the occlusion amount of oxygen in the three-way catalyst at which the amount of NOx generated in the three-way catalyst through ammonia falls within a permissible range even when this ammonia is generated due to the flow of exhaust gas through the NSR catalyst while rich spike is carried out. As described hitherto, when rich spike is carried out, ammonia can be restrained from flowing from the NSR catalyst to the three-way catalyst with the amount of oxygen occluded by the three-way catalyst larger than a predetermined amount. Therefore, NOx are restrained from being generated in the three-way catalyst, so the amount of NOx flowing out of the three-way catalyst can be reduced.

Besides, the exhaust gas control apparatus for the internal combustion engine may be further equipped with a selective reduction NOx catalyst. This selective reduction NOx catalyst may be configured to: (i) adsorb a reducing agent, and (ii) selectively reduce NOx by using the adsorbed reducing agent upon absorbing the NOx.

Besides, in the exhaust gas control apparatus for the internal combustion engine, the electronic control unit may be configured to: (i) integrate an amount of change in an adsorption amount of ammonia per unit time in the selective reduction NOx catalyst, (ii) calculate a current adsorption amount of ammonia from the amount of change, and (iii) carry out the rich spike in such a manner as to hold the adsorption amount of ammonia equal to or larger than a predetermined adsorption amount. Still further, the electronic control unit may be configured to: (i) integrate an amount of change in an adsorption amount of ammonia per unit time in the selective reduction NOx catalyst, (ii) calculate a current adsorption amount of ammonia from the amount of change, and (iii) carry out the rich spike at predetermined intervals.

According to the exhaust gas control apparatus for the internal combustion engine as described above, when rich spike for supplying ammonia to the selective reduction NOx catalyst is carried out, ammonia is produced in the occlusion reduction NOx catalyst after discharging the oxygen occluded by the three-way catalyst. As a result, ammonia is oxidized in the three-way catalyst, and NOx can be restrained from being generated. Thus, the amount of NOx flowing out of the three-way catalyst can be reduced when rich spike is carried out. Besides, ammonia can be restrained from being oxidized by the three-way catalyst, so a larger amount of ammonia can be supplied to the selective reduction NOx catalyst.

The exhaust gas control apparatus for the internal combustion engine according to the disclosure can reduce the amount of NOx flowing out of the three-way catalyst when the air-fuel ratio is temporarily lowered from a lean air-fuel ratio to a rich air-fuel ratio, in the case where the three-way catalyst is provided downstream of the NSR catalyst.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Modes for carrying out this disclosure will be described hereinafter in detail in an exemplary manner based on the embodiments thereof, with reference to the drawings. It should be noted, however, that the scope of the disclosure should not be limited to the dimensions, materials, shapes, relative arrangement and the like of components mentioned in these embodiments of the disclosure unless otherwise specified.

Figure 1:
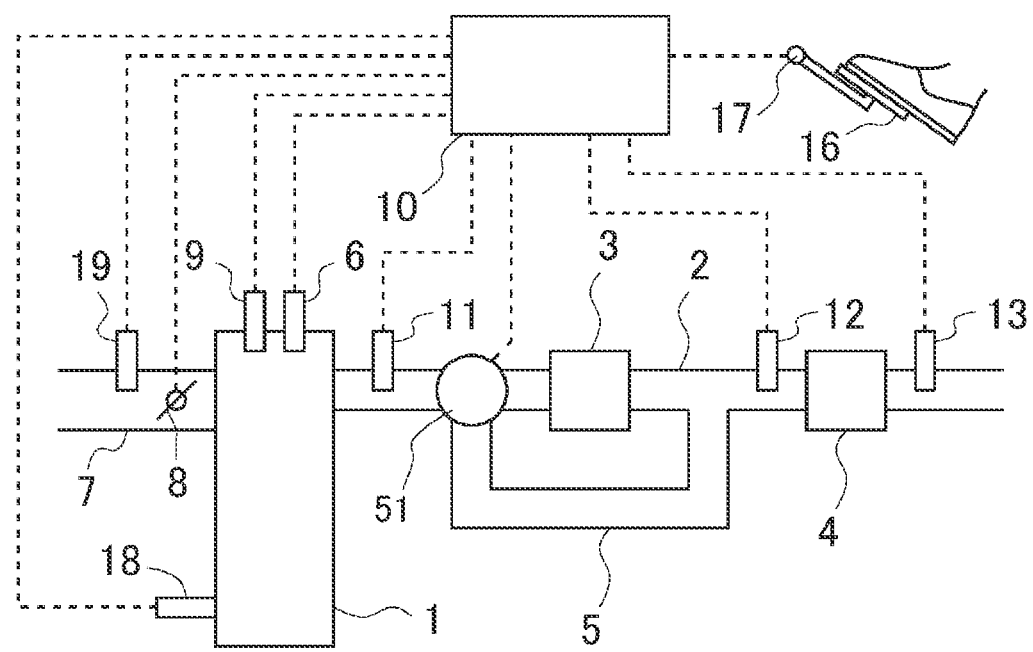
FIG. 1 is a view showing the general configuration of an internal combustion engine according to the first embodiment of the disclosure and intake and exhaust systems thereof.

First of all, the first embodiment of the disclosure will be described. FIG. 1 is a view showing the general configuration of an internal combustion engine 1 according to the present first embodiment of the disclosure and intake and exhaust systems thereof. The internal combustion engine 1 shown in FIG. 1 is a gasoline engine. The internal combustion engine 1 is mounted in, for example, a vehicle. An exhaust passage 2 is connected to the internal combustion engine 1. This exhaust passage 2 is provided, except at ends thereof, with an occlusion reduction NOx catalyst 3 (hereinafter referred to as an NSR catalyst 3) and a three-way catalyst 4 in this order from an upstream side.

The NSR catalyst 3 occludes NOx in exhaust gas when the air-fuel ratio of exhaust gas is a lean air-fuel ratio, and discharges and reduces the occluded NOx when the air-fuel ratio of exhaust gas is a rich air-fuel ratio. Incidentally, "occlusion" is used as a term including temporary adsorption of NOx as well. HC or CO as unburnt fuel discharged from the internal combustion engine 1 can be utilized as a reducing agent supplied to the NSR catalyst 3. Besides, the NSR catalyst 3 has an oxygen occlusion capacity. The NSR catalyst 3 occludes oxygen at a lean air-fuel ratio, and discharges this occluded oxygen at a rich air-fuel ratio.

The three-way catalyst 4 purifies NOx, HC and CO when a catalyst atmosphere is at or close to a theoretical air-fuel ratio. This three-way catalyst 4 has an oxygen occlusion capacity. That is, the three-way catalyst 4 occludes an excessive amount of oxygen when the air-fuel ratio of exhaust gas is a lean air-fuel ratio, and discharges a deficient amount of oxygen when the air-fuel ratio of exhaust gas is a rich air-fuel ratio. Due to this oxygen occlusion capacity, the three-way catalyst 4 can purify HC, CO and NOx even at a non-theoretical air-fuel ratio.

Incidentally, when exhaust gas at a rich air-fuel ratio passes through the NSR catalyst 3, the NOx in exhaust gas may react with HC or $H_2$ to produce ammonia ($NH_3$). For example, when $H_2$ is generated from the CO and $H_2O$ in exhaust gas due to a water gas shift reaction or a steam-reforming reaction, ammonia is produced through a reaction of the $H_2$ with NO in the NSR catalyst 3.

Besides, a bypass passage 5 that connects the exhaust passage 2 upstream of the NSR catalyst 3 and the exhaust passage 2 downstream of the NSR catalyst 3 and upstream of the three-way catalyst 4 to each other is provided. A changeover valve 51 that selects one of the NSR catalyst 3 and the bypass passage 5 and that causes exhaust gas to flow therethrough is provided in the exhaust passage 2 upstream of the NSR catalyst 3, at a location to which the bypass passage 5 is connected.

A first NOx sensor 11 that detects an air-fuel ratio of exhaust gas and a concentration of NOx in exhaust gas is attached to the exhaust passage 2 upstream of the changeover valve 51. Besides, a second NOx sensor 12 that detects an air-fuel ratio of exhaust gas and a concentration of NOx in exhaust gas is attached to the exhaust passage 2 downstream of the NSR catalyst 3 and upstream of the three-way catalyst 4. Besides, a third NOx sensor 13 that detects an air-fuel ratio of exhaust gas and a concentration of NOx in exhaust gas is attached to the exhaust passage 2 downstream of the three-way catalyst 4.

Besides, an injection valve 6 that supplies fuel to the internal combustion engine 1 is attached to the internal combustion engine 1. Furthermore, the internal combustion engine 1 is provided with an ignition plug 9 that generates electric sparks in a cylinder. Besides, an intake passage 7 is connected to the internal combustion engine 1. The intake passage 7 is provided, except at ends thereof, with a throttle 8 that adjusts the amount of intake air in the internal combustion engine 1. An airflow meter 19 that detects an amount of intake air in the internal combustion engine 1 is attached to the intake passage 7 upstream of the throttle 8.

An ECU 10 as an electronic control unit for controlling the internal combustion engine 1 configured as described above is provided in conjunction with the internal combustion engine 1. This ECU 10 controls the internal combustion engine 1 in accordance with an operation condition of the internal combustion engine 1 and a driver's request. In addition to the aforementioned sensors, an accelerator depression amount sensor 17 that outputs an electric signal corresponding to an amount of depression of an accelerator pedal 16 by the driver and that detects an engine load, and a crank position sensor 18 that detects an engine rotational speed are connected to the ECU 10 via electric wires. Output signals of these various sensors are input to the ECU 10. On the other hand, the injection valve 6, the throttle 8, the ignition plug 9 and the changeover valve 51 are connected to the ECU 10 via electric wires. These components are controlled by the ECU 10.

The ECU 10 sets a target air-fuel ratio based on an operating state (e.g., the engine rotational speed and the accelerator depression amount) of the internal combustion engine 1. Then, the ECU 10 controls the throttle 8 or the injection valve 6 such that the actual air-fuel ratio becomes equal to a target air-fuel ratio. Incidentally, the internal combustion engine 1 according to the present first embodiment of the disclosure is subjected to lean burn operation (i.e., operation at a lean air-fuel ratio). It should be noted, however, that the internal combustion engine 1 may be operated at or below the theoretical air-fuel ratio at the time of cold start of the internal combustion engine 1, high-load operation of the internal combustion engine 1, later-described rich spike or the like.

Besides, the ECU 10 operates the changeover valve 51 in accordance with the operating state or the target air-fuel ratio of the internal combustion engine 1. When the target air-fuel ratio of the internal combustion engine 1 is a lean air-fuel ratio, the ECU 10 operates the changeover valve 51 such that exhaust gas flows through the NSR catalyst 3, with a view to occluding NOx in the NSR catalyst 3. The operation of the changeover valve 51 in carrying out rich spike will be described later.

Besides, the internal combustion engine 1 is operated at the theoretical air-fuel ratio at the time of cold start thereof. At this time, NOx cannot be occluded by the NSR catalyst 3. However, in order to give priority to a rise in temperature of the NSR catalyst 3, the ECU 10 operates the changeover valve 51 such that exhaust gas flows through the NSR catalyst 3.

When lean burn operation is performed, the ECU 10 carries out so-called rich spike for temporarily lowering the air-fuel ratio of exhaust gas from the internal combustion engine 1 to a predetermined rich air-fuel ratio. Rich spike is carried out to reduce the NOx occluded by the NSR catalyst 3. Rich spike is carried out by adjusting the amount of fuel injected from the injection valve 6 and the opening degree of the throttle 8. Incidentally, in the present first embodiment of the disclosure, the ECU 10 performs the function of controlling the air-fuel ratio by carrying out rich spike.

Rich spike for reducing the NOx occluded by the NSR catalyst 3 is carried out when the occlusion amount of NOx in the NSR catalyst 3 becomes equal to a first occlusion amount. The occlusion amount of NOx in the NSR catalyst 3 can be obtained by integrating a value that is obtained by subtracting an amount of NOx flowing out of the NSR catalyst 3 per unit time and an amount of NOx reduced by the NSR catalyst 3 per unit time from an amount of NOx flowing into the NSR catalyst 3 per unit time. The amount of NOx flowing into the NSR catalyst 3 per unit time is estimated based on the operating state of the internal combustion engine 1. Besides, the amount of NOx flowing out of the NSR catalyst 3 per unit time can be obtained based on detection values of the second NOx sensor 12 and the airflow meter 19. The amount of NOx reduced by the NSR catalyst 3 per unit time, namely, the occlusion amount of NOx decreasing through rich spike per unit time is associated with the temperature of the NSR catalyst 3, the detection value of the airflow meter 19 and the air-fuel ratio of exhaust gas. Accordingly, the amount of NOx reduced by the NSR catalyst 3 per unit time can be calculated based on the temperature of the NSR catalyst 3, the detection value of the airflow meter 19 and the air-fuel ratio of exhaust gas, by obtaining these relationships in advance through an experiment, a simulation or the like. Incidentally, the occlusion amount of NOx in the NSR catalyst 3 is not limited to the aforementioned method, but may be calculated according to other known methods. The occlusion amount of NOx calculated by the ECU 10 will be referred to hereinafter as an estimated occlusion amount of NOx.

Rich spike for reducing the NOx occluded by the NSR catalyst 3 is carried out until the estimated occlusion amount of NOx becomes equal to or smaller than a second occlusion amount. This second occlusion amount is an occlusion amount of NOx that guarantees the completion of reduction of the NOx occluded by the NSR catalyst 3. The second occlusion amount may be substantially equal to 0.

It should be noted herein that when exhaust gas at a rich air-fuel ratio is caused to flow into the NSR catalyst 3, ammonia may be produced in the NSR catalyst 3. When this ammonia is oxidized by the oxygen occluded by the three-way catalyst 4, NOx are generated and hence may be discharged into the atmosphere. In contrast, according to the present first embodiment of the disclosure, when rich spike is started, exhaust gas is caused to flow through the bypass passage 5 by the changeover valve 51. That is, exhaust gas at a rich air-fuel ratio is caused to flow into the three-way catalyst 4 before being caused to flow into the NSR catalyst 3, so oxygen is discharged from the three-way catalyst 4. Then, after discharging oxygen from the three-way catalyst 4, exhaust gas at a rich air-fuel ratio is caused to flow into the NSR catalyst 3 to reduce the NOx occluded by the NSR catalyst 3. Then, even when ammonia is produced by the NSR catalyst 3, hardly no oxygen is occluded by the three-way catalyst 4, so NOx can be restrained from being generated due to the oxidation of ammonia. Accordingly, the amount of NOx discharged into the atmosphere can be reduced.

Figure 2:
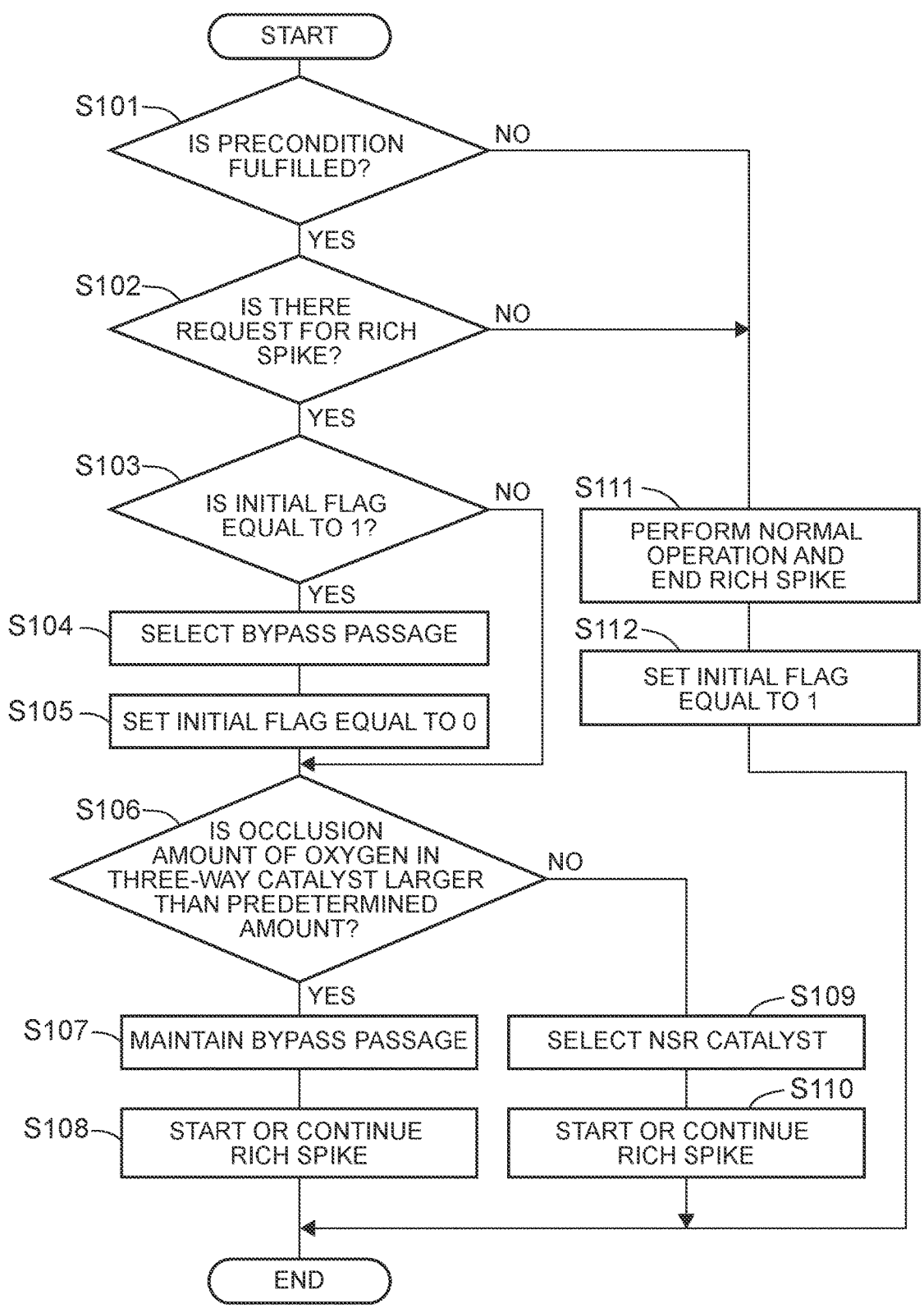
FIG. 2 is a flowchart showing the control flow at the time of rich spike according to the first embodiment of the disclosure.

FIG. 2 is a flowchart showing the control flow at the time of rich spike according to the present first embodiment of the disclosure. The present flowchart is executed at intervals of a predetermined time by the ECU 10.

In step S101, it is determined whether or not a precondition for carrying out rich spike is fulfilled. For example, it is determined whether or not an operation state of the internal combustion engine 1 is a state suited to carry out rich spike. At the same time, it is determined whether or not the temperatures of the NSR catalyst 3 and the three-way catalyst 4 are in a state suited to carry out rich spike. If the results of these determinations are both positive, the result of the determination in step S101 is positive. If even one of the results of these determinations is negative, the result of the determination in step S101 is negative. If the result of the determination in step S101 is positive, a transition to step S102 is made. On the other hand, if the result of the determination in step S101 is negative, a transition to step S111 is made.

In step S102, it is determined whether or not there is a request to carry out rich spike. If rich spike is not carried out, it is determined that there is a request to carry out rich spike when the estimated occlusion amount of NOx reaches the first occlusion amount. Besides, if rich spike is carried out, it is determined that there is a request to carry out rich spike when the estimated occlusion amount of NOx is larger than the second occlusion amount. The present step S102 is considered to determine whether or not the NOx occluded by the NSR catalyst 3 need to be reduced. If the result of the determination in step S102 is positive, a transition to step S103 is made. On the other hand, if the result of the determination in step S102 is negative, a transition to step S111 is made.

In step S103, it is determined whether or not an initial flag is equal to 1. The initial flag is a flag that becomes equal to 1 when rich spike ends, and that becomes equal to 0 as soon as the present step S103 is carried out for the first time when the initial flag is equal to 1. If the initial flag is equal to 1, rich spike is not carried out, and step S103 is processed for the first time since the end of last rich spike. That is, in the present step 103, it is determined whether or not there is a request to carry out rich spike and rich spike is not carried out. If the result of the determination in step S103 is positive, a transition to step S104 is made. On the other hand, if the result of the determination in step S103 is negative, a transition to step S106 is made.

In step S104, the changeover valve 51 is operated in such a manner as to cause exhaust gas to flow through the bypass passage 5. At this time, the internal combustion engine 1 has been operated at a lean air-fuel ratio, oxygen is occluded in the three-way catalyst 4. Therefore, in the present step S103, the bypass passage 5 is selected, and exhaust gas is kept from flowing through the NSR catalyst 3. Thus, even when rich spike is carried out, ammonia can be restrained from being produced in the NSR catalyst 3. Therefore, ammonia can be restrained from flowing into the three-way catalyst 4. When the process of step S104 ends, a transition to step S105 is made, and the ECU 10 sets the initial flag equal to 0.

In step S106, it is determined whether or not the occlusion amount of oxygen in the three-way catalyst 4 is larger than a predetermined amount. In the present step S106, it is determined whether or not a larger amount of NOx than a permissible amount flows out of the three-way catalyst 4 due to the oxygen occluded by the three-way catalyst 4 when exhaust gas at a rich air-fuel ratio is caused to flow through the NSR catalyst 3. This is considered to determine whether or not a period for carrying out rich spike has reached a predetermined period. Incidentally, the predetermined amount is an upper limit of the occlusion amount of oxygen of the three-way catalyst 4 at which the amount of NOx generated in the three-way catalyst 4 due to ammonia falls within a permissible range even when the ammonia is generated due to the flow of exhaust gas through the NSR catalyst 3 while rich spike is carried out. The predetermined amount may be exactly or approximately equal to 0. While a large amount of oxygen is occluded in the three-way catalyst 4, the air-fuel ratio of exhaust gas flowing out of the three-way catalyst 4 is substantially equal to the theoretical air-fuel ratio. When a sufficient amount of oxygen is discharged from the three-way catalyst 4, the air-fuel ratio of exhaust gas flowing out of the three-way catalyst 4 becomes a rich air-fuel ratio. Accordingly, in the present step S106, until the air-fuel ratio of exhaust gas flowing out of the three-way catalyst 4 becomes a rich air-fuel ratio after the start of rich spike, it can be determined that the occlusion amount of oxygen in the three-way catalyst 4 is larger than the predetermined amount. Besides, when the air-fuel ratio of exhaust gas flowing out of the three-way catalyst 4 becomes a rich air-fuel ratio, it can be determined that the occlusion amount of oxygen in the three-way catalyst 4 is equal to or smaller than the predetermined amount. Incidentally, in the present step S106, it is determined whether or not the occlusion amount of oxygen in the three-way catalyst 4 is larger than the predetermined amount. Instead, however, it may be determined whether or not an elapsed period from a timing of the start of rich spike has exceeded a constant period. The constant period is a period equivalent to the predetermined period, and is obtained in advance through an experiment, a simulation or the like as a period in which the occlusion amount of oxygen in the three-way catalyst 4 is larger than the predetermined amount. The elapsed period is equal to 0 when rich spike has not been started. Besides, in the present step S106, it is determined, based on the air-fuel ratio of exhaust gas flowing out of the three-way catalyst 4, whether or not the occlusion amount of oxygen in the three-way catalyst 4 is larger than the predetermined amount. Instead, however, it is also appropriate to estimate an occlusion amount of oxygen in the three-way catalyst 4 and determine whether or not this estimated value is larger than the predetermined amount. The occlusion amount of oxygen in the three-way catalyst 4 can be estimated based on the air-fuel ratio and amount of exhaust gas flowing into the three-way catalyst 4. If the result of the determination in step S106 is positive, a transition to step S107 is made. If the result of the determination in step S106 is negative, a transition to step S109 is made.

In step S107, the selection of the bypass passage 5 is maintained, and exhaust gas is caused to flow therethrough. In the foregoing step S104, exhaust gas is caused to flow through the bypass passage 5. Therefore, in the present step S107, exhaust continues to be caused to flow through the bypass passage 5. That is, even if the result of the determination in step S103 is negative, exhaust gas continues to be caused to flow through the bypass passage 5 until the result of the determination in step S106 becomes negative.

In step S108, rich spike is started or continued. That is, the internal combustion engine 1 is operated at a rich air-fuel ratio. Oxygen is discharged from the three-way catalyst 4 due to this rich spike. This rich spike may be carried out at a lower air-fuel ratio than rich spike for reducing NOx. That is, with a view to swiftly discharging oxygen from the three-way catalyst 4, this air-fuel ratio may be an air-fuel ratio that is relatively lower than a rich air-fuel ratio in reducing the NOx occluded by the NSR catalyst 3 within a rich air-fuel ratio range (this relatively low air-fuel ratio will be referred to hereinafter also as "a strongly rich air-fuel ratio"). In processing step S108, exhaust gas flows through the bypass passage 5. Therefore, rich spike is started or continued at a strongly rich air-fuel ratio in the present step S108. As a result, oxygen can be swiftly discharged from the three-way catalyst 4. Incidentally, in the present step S108, rich spike is started if it has not been started yet, and rich spike is continued if it is being carried out.

On the other hand, in step S109, the changeover valve 51 is operated in such a manner as to cause exhaust gas to flow through the NSR catalyst 3. That is, in the present step S109, the NSR catalyst 3 is selected, and exhaust gas is kept from flowing through the bypass passage 5. In processing the present step S109, the occlusion amount of oxygen in the three-way catalyst 4 is equal to or smaller than the predetermined amount. Therefore, even when ammonia is generated in the NSR catalyst 3, this ammonia is restrained from being oxidized by the three-way catalyst 4. Accordingly, exhaust gas is caused to flow through the NSR catalyst 3 with a view to reducing NOx by causing exhaust gas to flow through the NSR catalyst 3. Incidentally, in the present first embodiment of the disclosure, the ECU 10 performs a function of controlling the changeover valve by processing steps S103 to S107 and step S109.

In step S110, rich spike is started or continued. That is, the internal combustion engine 1 is operated at a rich air-fuel ratio. Due to the flow of exhaust gas at a rich air-fuel ratio into the NSR catalyst 3, the NOx occluded by the NSR catalyst 3 are reduced, and ammonia is produced in the NSR catalyst 3. Incidentally, when the internal combustion engine 1 is operated at a lean air-fuel ratio before the start of rich spike, oxygen is occluded by the NSR catalyst 3 as well. When exhaust gas at a rich air-fuel ratio is caused to flow into the NSR catalyst 3, oxygen is discharged before the reduction of NOx. While this oxygen is discharged, NOx are not reduced. Therefore, in order to swiftly reduce the NOx occluded by the NSR catalyst 3, it is desirable to swiftly discharge oxygen from the NSR catalyst 3. Thus, in the present first embodiment of the disclosure, while oxygen is discharged from the NSR catalyst 3, the internal combustion engine 1 may be operated at a strongly rich air-fuel ratio. When the discharge of oxygen from the NSR catalyst 3 ends, the internal combustion engine 1 may be operated at a weakly rich air-fuel ratio, namely, an air-fuel ratio that is relatively higher than a strongly rich air-fuel ratio within the rich air-fuel ratio range and that is suited to reduce NOx by the NSR catalyst 3. By carrying out rich spike at the strongly rich air-fuel ratio in discharging oxygen from the NSR catalyst 3, oxygen can be swiftly discharged from the NSR catalyst 3. On the other hand, the air-fuel ratio that is suited to reduce the NOx occluded by the NSR catalyst 3 is an air-fuel ratio that is higher than a strongly rich air-fuel ratio. Therefore, NOx can be efficiently reduced by carrying out rich spike at a weakly rich air-fuel ratio. The strongly rich air-fuel ratio in the present step S110 may be the same as the strongly rich air-fuel ratio in step S108. However, these air-fuel ratios may be set to optimal rich air-fuel ratios respectively as different air-fuel ratios. Ammonia is generated in the NSR catalyst 3 by causing exhaust gas at a rich air-fuel ratio to flow through the NSR catalyst 3. At this timing, however, the occlusion amount of oxygen in the three-way catalyst 4 is equal to or smaller than the predetermined amount, so NOx are restrained from being generated in the three-way catalyst 4. Incidentally, in the present step S110, rich spike is started if it has not been started yet, and rich spike is continued if it is being carried out.

On the other hand, if the result of the determination in step S101 is negative or if the result of the determination in step S102 is negative, a transition to step S111 is made to perform normal operation. In normal operation, a target air-fuel ratio is set based on the operating state of the internal combustion engine 1, and the changeover valve 51 is operated based on the operating state or the target air-fuel ratio of the internal combustion engine 1. Besides, if rich spike is carried out at the timing when step S111 is processed, this rich spike is ended. After that, a transition to step S112 is made to set the initial flag equal to 1.

Figure 3:
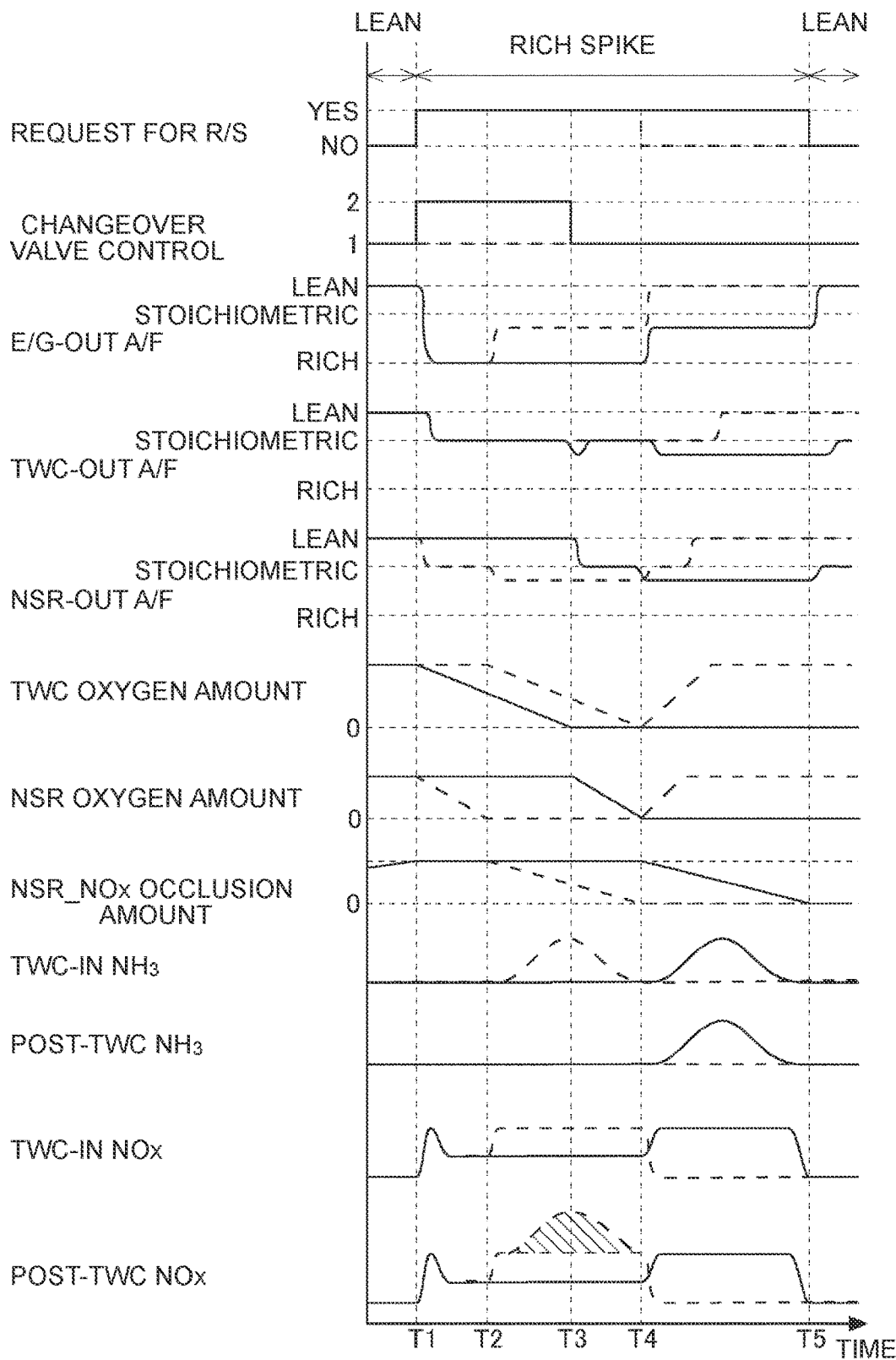
FIG. 3 is a time chart showing how various values change when rich spike according to the first embodiment of the disclosure is carried out.

FIG. 3 is a time chart showing how various values change when rich spike according to the present first embodiment of the disclosure is carried out. Solid lines represent a case where rich spike is carried out by operating the changeover valve 51 according to the present first embodiment of the disclosure. Broken lines represent a case where rich spike is carried out by operating the changeover valve 51 such that exhaust gas always flows through the NSR catalyst 3. In FIG. 3, "R/S REQUEST" indicates whether or not there is a request to carry out rich spike, "CHANGEOVER VALVE CONTROL" indicates which one of the NSR catalyst 3 and the bypass passage 5 the changeover valve 51 causes exhaust gas to flow through, "E/G-OUT A/F" denotes an air-fuel ratio of exhaust gas from the internal combustion engine 1, "TWC-OUT A/F" denotes an air-fuel ratio of exhaust gas flowing out of the three-way catalyst 4, "NSR-OUT A/F" denotes an air-fuel ratio of exhaust gas in the exhaust passage 2 downstream of the NSR catalyst 3 and upstream of a location to which a downstream end of the bypass passage 5 is connected, "TWC OXYGEN AMOUNT" denotes an occlusion amount of oxygen in the three-way catalyst 4, "NSR OXYGEN AMOUNT" denotes an occlusion amount of oxygen in the NSR catalyst 3, "NSR_NOx OCCLUSION AMOUNT" denotes an occlusion amount of NOx in the NSR catalyst 3, "TWC-IN NH$_3$" denotes a concentration of ammonia in the exhaust gas flowing into the three-way catalyst 4, "POST-TWC NH$_3$" denotes a concentration of ammonia in the exhaust gas flowing out of the three-way catalyst 4, "TWC-IN NOx" denotes a concentration of NOx in the exhaust gas flowing into the three-way catalyst 4, and "POST-TWC NOx" denotes a concentration of NOx in the exhaust gas flowing out of the three-way catalyst 4. In FIG. 3, the predetermined amount as the occlusion amount of oxygen in the foregoing three-way catalyst 4 is set equal to 0.

Incidentally, "1" in changeover valve control indicates that the changeover valve 51 causes exhaust gas to flow through the NSR catalyst 3, and "2" in changeover valve control indicates that the changeover valve 51 causes exhaust gas to flow through the bypass passage 5. Accordingly, when changeover valve control assumes "1", "TWC-IN NH$_3$" denotes a concentration of ammonia in the exhaust gas flowing out of the NSR catalyst 3, and "TWC-IN NOx" denotes a concentration of NOx in the exhaust gas flowing out of the NSR catalyst 3. On the other hand, when changeover valve control assumes "2", "TWC-IN NH$_3$" denotes a concentration of ammonia in the exhaust gas discharged from the internal combustion engine 1, and "TWC-IN NOx" denotes a concentration of NOx in the exhaust gas discharged from the internal combustion engine 1.

T1 denotes a timing when the occlusion amount of NOx in the NSR catalyst 3 becomes equal to the first occlusion amount. At this timing T1, the reduction of NOx is necessitated, so "WS REQUEST" changes from "NO" to "YES". At and before the timing T1, the internal combustion engine 1 is operated at a lean air-fuel ratio. Therefore, at the timing T1, the occlusion amounts of oxygen in the NSR catalyst 3 and the three-way catalyst 4 are large. Besides, when rich spike is carried out by operating the changeover valve 51 such that exhaust gas always flows through the NSR catalyst 3 (as indicated by the broken lines), the occlusion amount of oxygen in the NSR catalyst 3 becomes equal to 0 at a timing T2, and the occlusion amount of NOx in the NSR catalyst 3 becomes equal to 0 at a timing T4. On the other hand, when rich spike is carried out by operating the changeover valve 51 according to the present first embodiment of the disclosure (as indicated by the solid lines), the occlusion amount of oxygen in the three-way catalyst 4 becomes equal to 0 at a timing T3, the occlusion amount of oxygen in the NSR catalyst 3 becomes equal to 0 at the timing T4, and the occlusion amount of NOx in the NSR catalyst 3 becomes equal to 0 at a timing T5.

First of all, the case where rich spike is carried out by operating the changeover valve 51 according to the present first embodiment of the disclosure (as indicated by the solid lines) will be described. When "R/S REQUEST" changes from "NO" to "YES" at the timing T1, the changeover valve 51 is changed over, and the flow channel of exhaust gas changes from the NSR catalyst 3 to the bypass passage 5. At the same time, the target air-fuel ratio of the internal combustion engine 1 changes from a lean air-fuel ratio to a strongly rich air-fuel ratio, and "E/G-OUT A/F" thus changes from a lean air-fuel ratio to a strongly rich air-fuel ratio. In the case where the changeover valve 51 causes exhaust gas to flow through the bypass passage 5 at the timing T1 to keep exhaust gas from flowing through the NSR catalyst 3, even when "E/G-OUT A/F" becomes a strongly rich air-fuel ratio, exhaust gas at a strongly rich air-fuel ratio does not flow into the NSR catalyst 3, so "NSR-OUT A/F" does not change but remains equal to a lean air-fuel ratio, namely, an air-fuel ratio at and before the timing T1. The changeover valve 51 causes exhaust gas to flow through the bypass passage 5 until "TWC OXYGEN AMOUNT" becomes equal to 0 at the timing T3. Therefore, "NSR-OUT A/F" does not change but remains equal to a lean air-fuel ratio from the timing T1 to the timing T3. Accordingly, in this period, the NOx occluded by the NSR catalyst 3 are not reduced, so "NSR_NOx OCCLUSION AMOUNT" does not decrease.

Besides, exhaust gas at a rich air-fuel ratio does not flow into the NSR catalyst 3 from the timing T1 to the timing T3. Therefore, no ammonia is produced in the NSR catalyst 3, so "TWC-IN NH$_3$" does not change but remains equal to 0. Besides, exhaust gas at a strongly rich air-fuel ratio does not flow into the NSR catalyst 3 from the timing T1 to the timing T3. Therefore, "NSR OXYGEN AMOUNT" does not decrease, but exhaust gas at a strongly rich air-fuel ratio flows into the three-way catalyst 4, so "TWC OXYGEN AMOUNT" gradually decreases. Furthermore, exhaust gas at a strongly rich air-fuel ratio flows into the three-way catalyst 4 after the timing T1. However, from the timing T1 to the timing T3, the oxygen occluded by the three-way catalyst 4 is discharged, so "TWC-OUT A/F" is equal to the theoretical (stoichiometric) air-fuel ratio. Accordingly, at this time, no ammonia is produced in the three-way catalyst 4 either, so "POST-TWC NH$_3$" does not change but remains equal to 0.

Besides, the NOx discharged from the internal combustion engine 1 cannot be occluded by the NSR catalyst 3 from the timing T1 to the timing T3, so "TWC-IN NOx" is larger than at or before the timing T1. Besides, the air-fuel ratio of exhaust gas flowing into the three-way catalyst 4 is a rich air-fuel ratio from the timing T1 to the timing T3, but the oxygen occluded by the three-way catalyst 4 is discharged. As a result, the three-way catalyst 4 is at the theoretical air-fuel ratio, so NOx can be reduced. However, the amount of NOx discharged from the internal combustion engine 1 increases due to the operation of the internal combustion engine 1 at a rich air-fuel ratio, so NOx cannot be reduced by the three-way catalyst 4 alone. Therefore, "POST-TWC NOx" increases. Incidentally, in FIG. 3, the discharge amount of NOx from the internal combustion engine 1 temporarily increases due to a change in the air-fuel ratio of the internal combustion engine 1 immediately after the start of rich spike, namely, immediately after the timing T1. Therefore, "TWC-IN NOx" and "POST-TWC NOx" are temporarily high immediately after the timing T1.

Then, when the occlusion amount of oxygen in the three-way catalyst 4 becomes equal to 0 at the timing T3, "TWC-OUT A/F" changes to a rich air-fuel ratio. However, "CHANGEOVER VALVE CONTROL" is immediately set equal to 1, so exhaust gas flows through the NSR catalyst 3. Immediately after the changeover valve 51 makes a changeover between the flow channels, oxygen is occluded by the NSR catalyst 3. Therefore, when exhaust gas at a strongly rich air-fuel ratio flows into the NSR catalyst 3, oxygen is discharged from the NSR catalyst 3. Thus, "NSR-OUT A/F" becomes equal to the theoretical air-fuel ratio, so the air-fuel ratio of exhaust gas flowing into the three-way catalyst 4 also becomes equal to the theoretical air-fuel ratio. Accordingly, "TWC-OUT A/F" soon returns to the theoretical air-fuel ratio.

Exhaust gas at a rich air-fuel ratio flows into the NSR catalyst 3 from the timing T3 to the timing T4, so "NSR OXYGEN AMOUNT" gradually decreases. On the other hand, "NSR-OUT A/F" is equal to the theoretical air-fuel ratio from the timing T3 to the timing T4, so NOx are not reduced, and "NSR_NOx OCCLUSION AMOUNT" does not change. Besides, no ammonia is produced in the NSR catalyst 3 until "NSR-OUT A/F" becomes a rich air-fuel ratio. Therefore, neither "TWC-IN $NH_3$" nor "TWC-OUT $NH_3$" changes until the timing T4. Furthermore, "NSR-OUT A/F" is equal to the theoretical air-fuel ratio, so NOx cannot be occluded by the NSR catalyst 3. Therefore, "TWC-IN NOx" does not become equal to 0. Besides, it is difficult to reduce NOx by the three-way catalyst 4 alone, so "POST-TWC NOx" does not become equal to 0 either.

Then, when the occlusion amount of oxygen in the NSR catalyst 3 becomes equal to 0 at the timing T4, "E/G-OUT A/F" is enhanced within the rich air-fuel ratio range to reduce the NOx occluded by the NSR catalyst 3. That is, in the present first embodiment of the disclosure, when the oxygen occluded by the NSR catalyst 3 and the three-way catalyst 4 is discharged, a strongly rich air-fuel ratio is set to swiftly discharge oxygen. After that, with a view to making the air-fuel ratio suitable for the reduction of the NOx occluded by the NSR catalyst 3, the air-fuel ratio is enhanced within the rich air-fuel ratio range to be changed to a weakly rich air-fuel ratio. At this time, "NSR OXYGEN AMOUNT" and "TWC OXYGEN AMOUNT" are equal to 0. Therefore, "E/G-OUT A/F", "TWC-OUT A/F" and "NSR-OUT A/F" are all a weakly rich air-fuel ratio from the timing T4 to the timing T5 when rich spike ends.

When the reduction of NOx starts at the timing T4, ammonia is produced in the NSR catalyst 3, so "TWC-IN $NH_3$" increases. This ammonia flows into the three-way catalyst 4, but "TWC OXYGEN AMOUNT" is equal to 0 at this time. Therefore, ammonia flows out of the three-way catalyst 4 without being oxidized, so "POST-TWC $NH_3$" also increases in the same manner. Besides, the NOx that have not been reduced by the NSR catalyst 3 flow out of the NSR catalyst 3 from the timing T4 to the timing T5, so "TWC-IN NOx" increases. Furthermore, NOx cannot be reduced by the three-way catalyst 4 either due to a weakly rich air-fuel ratio, so "POST-TWC NOx" increases as well.

Then, the reduction of the NOx occluded by the NSR catalyst 3 is completed at the timing T5, "R/S REQUEST" changes from "YES" to "NO". Thus, rich spike ends, and the internal combustion engine 1 is operated at a lean air-fuel ratio.

Next, the case where rich spike is carried out by operating the changeover valve 51 such that exhaust gas always flows through the NSR catalyst 3 (as indicated by the broken lines) will be described. As indicated by the broken lines, in the case where exhaust gas always flows through the NSR catalyst 3, when rich spike is started at a rich air-fuel ratio at the timing T1, the amount of oxygen occluded by the NSR catalyst 3 gradually decreases first, and "NSR OXYGEN AMOUNT" becomes equal to 0 at the timing T2. Then, "NSR-OUT A/F" becomes equal to a rich air-fuel ratio at the timing T2, so the occlusion amount of oxygen in the three-way catalyst 4 starts decreasing. After that, "NSR_NOx OCCLUSION AMOUNT" becomes equal to 0 at the timing T4. When "NSR OXYGEN AMOUNT" becomes equal to 0 at the timing T2, "E/G-OUT A/F" changes from a strongly rich air-fuel ratio to a weakly rich air-fuel ratio. From the timing T2 to the timing T4, "NSR-OUT A/F" is a rich air-fuel ratio. Therefore, NOx cannot be occluded by the NSR catalyst 3, so "TWC-IN NOx" is high. Besides, NOx cannot be completely purified by the three-way catalyst 4 alone, so "POST-TWC NOx" is also high.

Besides, "NSR OXYGEN AMOUNT" becomes equal to 0 and "NSR-OUT A/F" becomes a rich air-fuel ratio at the timing T2, the reduction of NOx by the NSR catalyst 3 starts, and ammonia is also produced in the NSR catalyst 3. Therefore, after the timing T2, ammonia flows out of the NSR catalyst 3, and "TWC-IN $NH_3$" rises. At this time, the occlusion amount of oxygen in the three-way catalyst 4 has not decreased to 0. Therefore, the ammonia that has flowed out of the NSR catalyst 3 is oxidized by the oxygen occluded by the three-way catalyst 4 to generate NOx. Therefore, NOx flow out of the three-way catalyst 4, so "POST-TWC NOx" further increases although "POST-TWC $NH_3$" does not increase after the timing T2. Incidentally, in FIG. 3, the amount of NOx generated through the oxidation of the ammonia that has flowed out of the NSR catalyst 3 by the oxygen occluded by the three-way catalyst 4 is indicated by hatching. Then, "NSR_NOx OCCLUSION AMOUNT" becomes equal to 0 at the timing T4. Therefore, "RIS REQUEST" changes from "YES" to "NO", and rich spike ends.

As shown in FIG. 3, the time for carrying out rich spike is shorter but the total discharge amount of NOx is larger in the case where rich spike is carried out by operating the changeover valve 51 such that exhaust gas always flows through the NSR catalyst 3 (as indicated by the broken lines) than in the case where rich spike is carried out by operating the changeover valve 51 according to the present first embodiment of the disclosure (as indicated by the solid lines). Accordingly, the amount of NOx discharged into the atmosphere can be reduced by carrying out rich spike by operating the changeover valve 51 according to the present first embodiment of the disclosure.

Incidentally, in the foregoing description, the internal combustion engine 1 is operated at a lean air-fuel ratio after rich spike is ended. Instead, however, the internal combustion engine 1 can also be operated at the theoretical air-fuel ratio after rich spike is ended.

As described above, according to the present first embodiment of the disclosure, NOx can be restrained from being generated through the oxidation of ammonia by the three-way catalyst 4, by reducing the NOx occluded by the NSR catalyst 3 after discharging the oxygen occluded by the three-way catalyst 4 in carrying out rich spike, in the case where the three-way catalyst 4 is provided downstream of the NSR catalyst 3. Thus, the amount of NOx flowing out of the three-way catalyst 4 in carrying out rich spike can be reduced.

Figure 4:
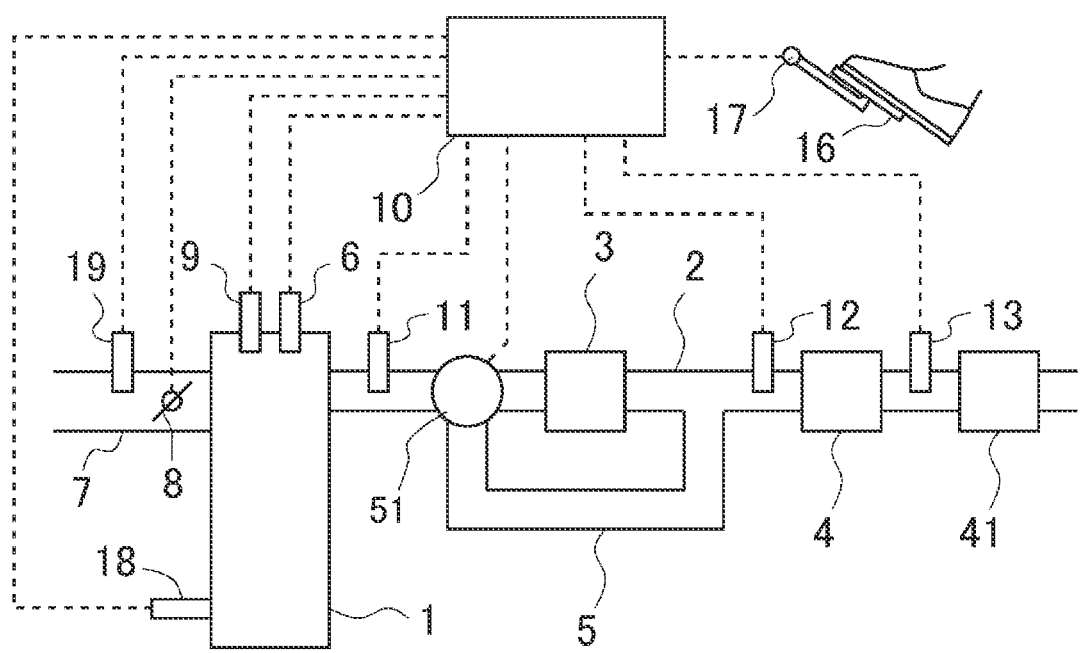
FIG. 4 is a view showing the general configuration of an internal combustion engine according to the second embodiment of the disclosure and intake and exhaust systems thereof.

Next, the second embodiment of the disclosure will be described. FIG. 4 is a view showing the general configuration of the internal combustion engine 1 according to the second embodiment of the disclosure and intake and exhaust systems thereof. What is different from FIG. 1 will be mainly described. In the present second embodiment of the disclosure, a selective reduction NOx catalyst 41 (hereinafter referred to as an SCR catalyst 41) is provided in the exhaust passage 2 downstream of the third NOx sensor 13. The SCR catalyst 41 adsorbs a reducing agent, and selectively reduces NOx by the adsorbed reducing agent when the NOx flow into the SCR catalyst 41. Ammonia that is produced in the NSR catalyst 3 when rich spike is carried out can be utilized as the reducing agent supplied to the SCR catalyst 41. Therefore, the ECU 10 produces ammonia in the NSR catalyst 3 by carrying out rich spike, and supplies this ammonia to the SCR catalyst 41.

It should be noted herein that the ECU 10 estimates an adsorption amount of ammonia in the SCR catalyst 41. In the present second embodiment of the disclosure, the adsorption amount of ammonia in the SCR catalyst 41 is obtained by integrating an amount of change in the adsorption amount of ammonia in the SCR catalyst 41 per unit time. The amount of change in the adsorption amount of ammonia in the SCR catalyst 41 per unit time can be obtained by subtracting an amount of decrease in the adsorption amount of ammonia per unit time from an amount of increase in the adsorption amount of ammonia per unit time. The amount of increase in the adsorption amount of ammonia in the SCR catalyst 41 per unit time can be an amount of ammonia generated in the NSR catalyst 3 per unit time. Besides, the amount of decrease in the adsorption amount of ammonia in the SCR catalyst 41 per unit can be an amount of ammonia consumed by the SCR catalyst 41 per unit time and an amount of ammonia desorbed from the SCR catalyst 41 per unit time. Then, an adsorption amount of ammonia at the moment is calculated by integrating the amount of change in the adsorption amount of ammonia in the SCR catalyst 41 per unit time. These values can be calculated based on, for example, a fuel injection amount, a temperature of the SCR catalyst 41, an intake air amount of the internal combustion engine 1 and the like. A known technology can be used as a method of calculating the adsorption amount of ammonia in the SCR catalyst 41, so the details will be omitted. The ECU 10 sequentially estimates the adsorption amount of ammonia in the SCR catalyst 41.

Rich spike for supplying ammonia to the SCR catalyst 41 is carried out when the amount of ammonia adsorbed by the SCR catalyst 41 decreases to a predetermined lower-limit adsorption amount. That is, rich spike is carried out in such a manner as to hold the adsorption amount of ammonia in the SCR catalyst 41 equal to or larger than the predetermined lower-limit adsorption amount. The lower-limit adsorption amount is set such that the purification rate of NOx in the SCR catalyst 41 falls within a permissible range. Incidentally, rich spike for supplying ammonia to the SCR catalyst 41 may be carried out at predetermined intervals regardless of the lower-limit adsorption amount.

Then, rich spike is carried out until the amount of ammonia adsorbed by the SCR catalyst 41 becomes equal to an amount of ammonia as a target (hereinafter referred to also as a target ammonia amount). This target ammonia amount is set within such a range that the purification rate of NOx in the SCR catalyst 41 is permitted and that ammonia can be restrained from flowing out of the SCR catalyst 41 even when the temperature of the SCR catalyst 41 fluctuates. Incidentally, rich spike for supplying ammonia to the SCR catalyst 41 may be carried out for a preset time regardless of the target ammonia amount, or may be carried out until ammonia flows out of the SCR catalyst 41. Besides, the air-fuel ratio in rich spike for producing ammonia may be the same as the air-fuel ratio in rich spike for reducing the NOx occluded by the NSR catalyst 3. However, these air-fuel ratios may be set to appropriate air-fuel ratios respectively.

As described hitherto, rich spike is carried out even in the case where ammonia is supplied to the SCR catalyst 41. However, if oxygen is adsorbed by the three-way catalyst 4 when ammonia is supplied to the SCR catalyst 41, the ammonia produced in the NSR catalyst 3 is oxidized by the three-way catalyst 4. Accordingly, NOx flow into the SCR catalyst 41 instead of ammonia, so the adsorption amount of ammonia in the SCR catalyst 41 further decreases. Then, it is difficult to purify NOx in the SCR catalyst 41, and NOx may pass through the SCR catalyst 41.

Thus, in the present second embodiment of the disclosure, in the case where rich spike for supplying ammonia to the SCR catalyst 41 is carried out, the oxygen occluded by the three-way catalyst 4 is discharged by first causing exhaust gas to flow through the bypass passage 5 by the changeover valve 51, and ammonia is produced by causing exhaust gas to flow through the NSR catalyst 3 after the completion of discharge of oxygen from the three-way catalyst 4. Even when ammonia flows into the three-way catalyst 4 through the production of ammonia in the NSR catalyst 3 in this manner, hardly no oxygen has been occluded by the three-way catalyst 4 at this time, so ammonia can be restrained from being oxidized. Accordingly, the ammonia produced in the NSR catalyst 3 can pass through the three-way catalyst 4, so the SCR catalyst 41 can be supplied with ammonia.

Incidentally, in the first embodiment of the disclosure, when it is determined in step S102 of FIG. 2 whether or not there is a request to carry out rich spike, it is determined whether or not the NOx occluded by the NSR catalyst 3 need to be reduced. However, in the present second embodiment of the disclosure, it is determined whether or not ammonia needs to be supplied to the SCR catalyst 41. Then, in the case where rich spike is not carried out, when the adsorption amount of ammonia calculated by the ECU 10 reaches a reduction adsorption amount, it is determined that ammonia needs to be supplied to the SCR catalyst 41. On the other hand, in the case where rich spike is carried out, until the adsorption amount of ammonia calculated by the ECU 10 reaches the target ammonia amount, it is determined that the SCR catalyst 41 needs to be supplied with ammonia.

As described above, according to the present second embodiment of the disclosure, in the case where the three-way catalyst 4 and the SCR catalyst 41 are provided downstream of the NSR catalyst 3, when rich spike for supplying ammonia to the SCR catalyst 41 is carried out, ammonia is produced in the NSR catalyst 3 after discharging the oxygen occluded by the three-way catalyst 4. Thus, NOx can be restrained from being generated through the oxidation of ammonia in the three-way catalyst 4. Thus, the amount of NOx flowing out of the three-way catalyst 4 can be reduced when rich spike is carried out. Besides, ammonia can be restrained from being oxidized by the three-way catalyst 4, so a larger amount of ammonia can be supplied to the SCR catalyst 41. Accordingly, a larger amount of NOx can be reduced by the SCR catalyst 41, so the amount of NOx discharged into the atmosphere can be reduced.

What is claimed is:

1. An exhaust gas control apparatus for an internal combustion engine, the internal combustion engine being operable at a lean air-fuel ratio, the exhaust gas control apparatus comprising:
   a three-way catalyst provided in an exhaust passage of the internal combustion engine, the exhaust passage including a first exhaust passage and a second exhaust passage, and the three-way catalyst being configured to occlude oxygen;
   an occlusion reduction NOx catalyst provided in the exhaust passage upstream of the three-way catalyst, the occlusion reduction NOx catalyst being configured to:
   (i) occlude NOx at the lean air-fuel ratio, and (ii) reduce the NOx and produce ammonia at a rich air-fuel ratio;

a bypass passage configured to connect the first exhaust passage upstream of the occlusion reduction NOx catalyst and the second exhaust passage downstream of the occlusion reduction NOx catalyst and upstream of the three-way catalyst to each other;

a changeover valve configured to select one of the bypass passage or the occlusion reduction NOx catalyst and to cause exhaust gas to flow through the selected one of the bypass passage or the occlusion reduction NOx catalyst; and an electronic control unit configured to:
(i) carry out rich spike for temporarily changing an air-fuel ratio of the internal combustion engine from the lean air-fuel ratio to the rich air-fuel ratio,
(ii) operate the changeover valve such that exhaust gas flows through the bypass passage, in response to starting the rich spike in air-fuel ratio control, and
(iii) operate the changeover valve such that exhaust gas flows through the occlusion reduction NOx catalyst after having carried out the rich spike for a predetermined period in the air-fuel ratio control.

2. The exhaust gas control apparatus for the internal combustion engine according to claim 1, further comprising:

a selective reduction NOx catalyst configured to:
(i) adsorb a reducing agent, and
(ii) selectively reduce NOx by using the adsorbed reducing agent upon absorbing the NOx.

3. The exhaust gas control apparatus for the internal combustion engine according to claim 2, wherein
the electronic control unit is configured to:
(i) integrate an amount of change in an adsorption amount of ammonia per unit time in the selective reduction NOx catalyst,
(ii) calculate a current adsorption amount of ammonia from the amount of change, and
(iii) carry out the rich spike in such a manner as to hold the adsorption amount of ammonia equal to or larger than a predetermined adsorption amount.

4. The exhaust gas control apparatus for the internal combustion engine according to claim 2, wherein
the electronic control unit is configured to:
(i) integrate an amount of change in an adsorption amount of ammonia per unit time in the selective reduction NOx catalyst,
(ii) calculate a current adsorption amount of ammonia from the amount of change, and
(iii) carry out the rich spike at predetermined intervals.

\* \* \* \* \*

UNITED STATES PATENT AND TRADEMARK OFFICE
CERTIFICATE OF CORRECTION

PATENT NO. : 10,385,749 B2
APPLICATION NO. : 15/609179
DATED : August 20, 2019
INVENTOR(S) : Hiroyoshi Ueda It is certified that error appears in the above-identified patent and that said Letters Patent is hereby corrected as shown below:

In the Specification

In Column 11, Line 42, delete ""WS REQUEST"" and insert --"R/S REQUEST"--, therefor.

In Column 14, Line 26 & 27, delete ""RIS REQUEST"" and insert --"R/S REQUEST"--, therefor.

Signed and Sealed this
Fifth Day of November, 2019

Andrei Iancu
*Director of the United States Patent and Trademark Office*